(12) United States Patent
Ran

(10) Patent No.: US 12,379,625 B2
(45) Date of Patent: Aug. 5, 2025

(54) BACKLIGHT ASSEMBLY AND DISPLAY DEVICE

(71) Applicant: SEOUL SEMICONDUCTOR (SHENZHEN) CO., LTD., Shenzhen (CN)

(72) Inventor: Longkun Ran, Shenzhen (CN)

(73) Assignee: SEOUL SEMICONDUCTOR (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/707,411

(22) PCT Filed: Sep. 27, 2022

(86) PCT No.: PCT/CN2022/121704
§ 371 (c)(1),
(2) Date: May 3, 2024

(87) PCT Pub. No.: WO2023/077997
PCT Pub. Date: May 11, 2023

(65) Prior Publication Data
US 2025/0035982 A1    Jan. 30, 2025

(30) Foreign Application Priority Data
Nov. 5, 2021   (CN) .......................... 202111306086.7

(51) Int. Cl.
*G02F 1/00*        (2006.01)
*G02F 1/13357*    (2006.01)

(52) U.S. Cl.
CPC .. *G02F 1/133608* (2013.01); *G02F 1/133605* (2013.01); *G02F 1/133603* (2013.01)

(58) Field of Classification Search
None
See application file for complete search history.

(56) References Cited

U.S. PATENT DOCUMENTS

2009/0180282 A1*   7/2009   Aylward .......... G02F 1/133605
                                                        362/245
2021/0057394 A1*   2/2021   Abe .................... H01L 25/0753
(Continued)

FOREIGN PATENT DOCUMENTS

CN         210181345 U       3/2020
CN         111061091 A       4/2020
(Continued)

OTHER PUBLICATIONS

International Search Report mailed on Jan. 4, 2023 in PCT/CN2022/121704 filed on Sep. 27, 2022 (9 pages).

*Primary Examiner* — Gerald J Sufleta, II
(74) *Attorney, Agent, or Firm* — Oblon, McClelland, Maier & Neustadt, L.L.P.

(57) ABSTRACT

The present disclosure relates to a backlight assembly and a display device. The backlight assembly includes: a substrate; a plurality of light-emitting elements for emitting light, wherein the plurality of light-emitting elements are disposed on the substrate; and an isolation wall disposed on the substrate, wherein, the light-emitting elements and the isolation wall are spaced apart from each other on the substrate; a height of the isolation wall is greater than a height of the light-emitting element in a first direction which is a direction of thickness of the substrate. The present disclosure does not require the process of adding molding parts on the substrate by disposing the isolation wall on the substrate. The isolation wall and the light-emitting elements are spaced apart from each other to facilitate subsequent replacement and maintenance. The height of the isolation wall is greater than the height of the light-emitting element, the isolation wall is in contact with the diffusion plate or isolation plate in the subsequent process, which can prevent the diffusion plate or isolation plate from damaging the (Continued)

surface of the light-emitting element, that is, the LED lamp bead, in the subsequent process and improve production yield.

14 Claims, 10 Drawing Sheets

(56) References Cited

U.S. PATENT DOCUMENTS

2021/0149251 A1\* 5/2021 Lee ................... G02F 1/133603
2023/0343895 A1\* 10/2023 Cao ...................... H10H 20/857

FOREIGN PATENT DOCUMENTS

| CN | 111443524 A | 7/2020 |
| CN | 112817176 A | 5/2021 |
| CN | 113189816 A | 7/2021 |
| CN | 113467127 A | 10/2021 |

\* cited by examiner

BACKLIGHT ASSEMBLY AND DISPLAY DEVICE

CROSS REFERENCE TO RELATED APPLICATIONS

This application is a National Stage entry under 35 U.S.C. § 371 of PCT/CN2022/121704, filed on Sep. 27, 2022, and claims priority to Chinese Patent Application No. 202111306086.7, filed on Nov. 5, 2021, the entire contents of which are incorporated herein by reference.

BACKGROUND

1. Field

The present disclosure relates to a display technical field, and more particularly to a backlight assembly and display device.

2. Description of Related Art

Mini Light Emitting Diode (Mini LED) screen is a type of Light Emitting Diode (LED) screen, with a chip size thereof ranging between 50-200 μm, and is a technical product of LED miniaturization and matrixing. Compared to an ordinary LED, the chip size of Mini LED is less than 50 μm, only 1% of the ordinary LED, yet the picture representation and property thereof are several times better than those of the ordinary LED.

With the enhancement of the Mini LED technology, the screen now has multiple backlight isolations which may control the brightness of a small area of the screen independently. This allows for brighter areas to be sufficiently bright while darker areas may be appropriately dimmed, reducing the limitations in display performance. When a certain part of the screen needs to display black, the small backlight isolation of this part may be dimmed or even turned off, to obtain a more pure black color and significantly improve the contrast of the screen, which cannot be achieved by an ordinary LCD screen. With the enhancement of the Mini LED technology, it is possible to have a contrast close to that of an OLED screen.

SUMMARY

To overcome the problems existed in the related art, the present disclosure provides a backlight assembly and display device.

In accordance with a first aspect of the embodiments of the present disclosure, a backlight assembly is provided, which includes: a substrate; a plurality of light-emitting elements for emitting light, wherein the plurality of light-emitting elements are disposed on the substrate; and an isolation wall disposed on the substrate, wherein, the light-emitting elements and the isolation wall are spaced apart from each other on the substrate; a height of the isolation wall is greater than a height of the light-emitting element in a first direction which is a direction of thickness of the substrate.

In some embodiment, the isolation wall is disposed between adjacent the light-emitting elements to isolate the adjacent light-emitting elements.

In some embodiment, the isolation wall forms a plurality of accommodation cavities on the substrate, the accommodation cavities surround the light-emitting element, and one light emitting element is disposed in each accommodation cavity.

In some embodiment, in a cross-section perpendicular to the first direction, the accommodation cavity is in any one or several combinations of rectangular, circular, elliptical, rhombus or polygonal shapes.

In some embodiment, a side wall of the isolation wall is perpendicular or inclined to the substrate.

In some embodiment, when the side wall of the isolation wall is inclined to the substrate, in the longitudinal-section parallel to the first direction, the side wall of the isolation wall is in any one or several combinations of rectilinear, curved, and stepped shapes.

In some embodiment, the isolation wall comprises transparent insulating material, or the isolation wall comprises reflective material.

In some embodiment, when the side wall of the isolation wall is perpendicular to the substrate or the angle between the side wall of the isolation wall and the substrate forms an acute angle, the isolation wall comprises transparent insulating material.

In some embodiment, when the angle between the side wall of the isolation wall and the substrate is an obtuse angle, the isolation wall comprises reflective white insulating material.

In some embodiment, the isolation wall is in the form of a narrowed width at the end.

In some embodiment, the isolation wall is formed in one piece or is composed of multiple sub-isolation walls.

In some embodiments, the separation wall is injection molded and fixed to the substrate through adhesive or shaft holes.

In some embodiments, the isolation wall includes a thermosetting material, and the isolation wall is fixed to the substrate by thermally curing the thermosetting material.

In some embodiments, the plurality of the light-emitting elements are distributed in an array on the substrate, or a plurality of the light-emitting elements in two adjacent rows or columns are staggeredly distributed.

In some embodiments, the plurality of the light-emitting elements are arranged at equal intervals in a second direction and a third direction; a first interval of the plurality of the light-emitting elements in the second direction is equal to or different from a second interval in the third direction; wherein, the second direction and the third direction intersect or are perpendicular to each other, and are both perpendicular to the first direction.

In some embodiments, the substrate is a Printed Circuit Board, and the substrate is a flexible substrate or a rigid substrate.

In accordance with a second aspect of the embodiments of the present disclosure, a display device is provided, which includes: a display module having a display surface for displaying image; a backlight assembly disposed in the back direction of the display module opposite to the display surface; wherein, the backlight assembly includes: a substrate; a plurality of light-emitting elements for emitting light, wherein the plurality of light-emitting elements spaced apart from each other on the substrate; and an isolation wall disposed on the substrate, wherein, the light-emitting elements and the isolation wall are disposed on the same side and spaced apart from each other on the substrate; a height of the isolation wall is greater than a height of the light-emitting element in a first direction which is a direction of thickness of the substrate.

In some embodiments, the display device further includes a diffusion plate; the diffusion plate is disposed between the display module and the backlight assembly.

In some embodiments, the display device further includes an isolation plate; the isolation plate is disposed between the diffusion plate and the backlight assembly.

In some embodiments, the isolation wall is disposed between adjacent light-emitting elements to isolate adjacent light-emitting elements.

In some embodiment, the isolation wall forms a plurality of accommodation cavities on the substrate, the accommodation cavities surround the light-emitting element, and one light emitting element is disposed in each accommodation cavity.

In some embodiment, in a cross-section perpendicular to the first direction, the accommodation cavity is in any one or several combinations of rectangular, circular, elliptical, rhombus or polygonal shapes.

In some embodiment, a side wall of the isolation wall is perpendicular or inclined to the substrate.

In some embodiment, when the side wall of the isolation wall is inclined to the substrate, in the longitudinal-section parallel to the first direction, the side wall of the isolation wall is in any one or several combinations of rectilinear, curved, and stepped shapes.

In some embodiment, the isolation wall comprises transparent insulating material, or the isolation wall comprises reflective material.

In some embodiment, when the side wall of the isolation wall is perpendicular to the substrate or the angle between the side wall of the isolation wall and the substrate forms an acute angle, the isolation wall comprises transparent insulating material.

In some embodiment, when the angle between the side wall of the isolation wall and the substrate is an obtuse angle, the isolation wall comprises a reflective white insulating material.

In some embodiment, the isolation wall is formed in one piece or is composed of multiple sub-isolation walls.

In some embodiments, the separation wall is injection molded and fixed to the substrate through adhesive or shaft holes.

In some embodiments, the isolation wall includes a thermosetting material, and the isolation wall is fixed to the substrate by thermally curing the thermosetting material.

In some embodiments, the plurality of the light-emitting elements are distributed in an array on the substrate, or a plurality of the light-emitting elements in two adjacent rows or columns are staggeredly distributed.

In some embodiments, the plurality of the light-emitting elements are arranged at equal intervals in a second direction and a third direction; a first interval of the plurality of the light-emitting elements in the second direction is equal to or different from a second interval in the third direction; wherein, the second direction and the third direction intersect or are perpendicular to each other, and are both perpendicular to the first direction.

In some embodiments, the substrate is a Printed Circuit Board, and the substrate is a flexible substrate or a rigid substrate.

The technical solutions provided in the embodiments of the present disclosure may include the following beneficial effects: by disposing the isolation wall on the substrate, the present disclosure does not require the process of adding molding parts on the substrate. The isolation wall and the light-emitting elements are spaced apart from each other to facilitate subsequent replacement and maintenance. The height of the isolation wall is greater than the height of the light-emitting element, the isolation wall is in contact with the diffusion plate or isolation plate in the subsequent process, which can prevent the diffusion plate or isolation plate in the subsequent process from damaging the surface of the light-emitting element, that is, the LED lamp bead, and improve production yield.

It should be understood that both the foregoing general description and the following detailed description are exemplary and explanatory and are not meant to limit the present disclosure.

BRIEF DESCRIPTION OF THE DRAWINGS

The drawings herein are incorporated into the description and form part of the present description, showing embodiments consistent with the present disclosure, and together with the description, it is used to explain the principles of the present disclosure.

DETAILED DESCRIPTION

Figure 1:
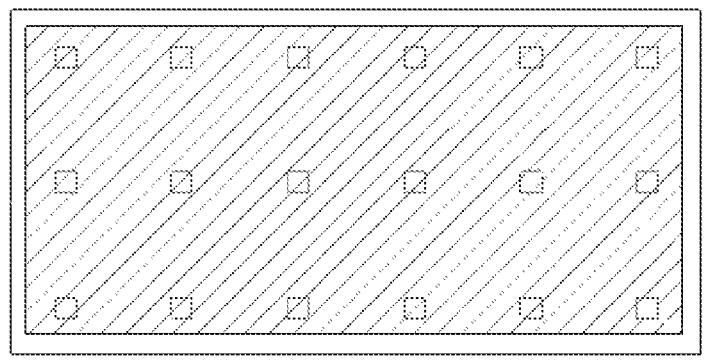
FIG. 1 is a schematic diagram of a structure in which a full-surface molding part is added on a substrate in the related art.

The exemplary embodiments will now be described in detail, examples of which are shown in the drawings. Where the description below relates to drawings, the same number in different drawings represents the same or similar element unless otherwise indicated. The embodiments described in the following exemplary embodiments do not represent all embodiments consistent with the present disclosure. Instead, they are only examples of apparatuses and methods consistent with some aspects of the present disclosure as detailed in the accompanying claims.

Mini LED is a semiconductor device including compounds containing gallium (Ga), arsenic (As), phosphorus (P), nitrogen (N), etc., and is sensitive to static electricity and pressure. In order to protect a light-emitting surface of the Mini LED from being damaged during subsequent assembly processes, a process of adding molding part on the substrate is usually used. The process of molding part includes: full-surface molding part and single-point molding part.

Figure 2:
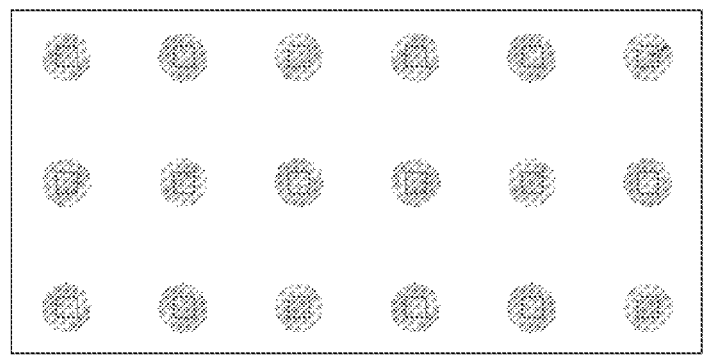
FIG. 2 is a schematic diagram of the structure in which a single-point molding part is added on a substrate in the related art.

As shown in FIG. 1, it is a schematic diagram of a structure in which a full-surface molding part is added on a substrate. Full-surface molding part, that is, the entire substrate is covered by the molding part to cover all Mini LEDs located on the substrate. As shown in FIG. 2, it is a schematic diagram of a structure in which single-point molding parts are added on a substrate. Single-point molding part, that is, single Mini LED on the substrate is individually covered to form point-like coverage.

However, the light-emitting quality of the plurality of light-emitting elements on the substrate determines important parameters of the LCD screen such as the brightness, uniformity of emitted light, and color gradation, and largely determines the light-emitting effect of the LCD screen.

Therefore, in the process of adding molding parts on the substrate, whether it is a full-surface molding part or a single-point molding part, in order to ensure that the intensity and direction of emitted light of the plurality of light-emitting elements on the substrate are consistent, it is necessary to ensure that the thickness, surface flatness, light transmittance or curvature of the edges of the full-surface molding part or single-point molding parts must be consistent, which places high technical requirements. In addition, when one or more of the plurality of light-emitting elements are ineffective and needs to be replaced, the full-surface molding part or the corresponding single-point molding part needs to be destroyed, resulting in high repair costs. Therefore, there is an urgent need for a backlight assembly that can simplify the production process and it can also produce high production yield.

To overcome the problems existing in the related art, the present disclosure provides a backlight assembly and display device. In the present disclosure, the term "backlight assembly" is not limited to its literal content but may refer to a light module, light assembly, light component, etc., as long as it is a backlight assembly that can be applied to the display device.

The backlight assembly 10 provided by the present disclosure includes a substrate 11, a plurality of light-emitting elements 12 and an isolation wall 13. Wherein, the plurality of light-emitting elements 12 are disposed on the substrate 11, and the plurality of light-emitting elements 12 are used for emitting light. The isolation wall 13 may also be disposed on the substrate 11 and located on the same side of the substrate 11 as the light-emitting element 12. Wherein, the light-emitting element 12 and the isolation wall 13 are spaced apart from each other on the substrate 11; in a first direction which is a thickness direction of the substrate 11, a height of the isolation wall 13 is greater than a height of the light-emitting element 12.

In the present disclosure, the plurality of light-emitting elements 12 of the backlight assembly 10 are fixed on the substrate 11 and emit light forward. Along the direction in which the light-emitting element 12 emits light, structures such as a diffusion plate 40 and an isolation plate are usually provided.

Therefore, in order to protect the light-emitting surface of the light-emitting element 12 of the Mini LED from being damaged during subsequent assembly processes, the present disclosure dispose the isolation wall 13 on the substrate 11 without the need for the process of adding molding part on the substrate 11, the process of disposing the isolation wall 13 needs low technological requirement, and uneven light emission of the light-emitting element 12 caused by uneven molding parts can be avoided.

The isolation wall 13 and the light-emitting element 12 are spaced apart from each other, which facilitates subsequent replacement and maintenance without damaging the light-emitting element 12, and the maintenance cost is low.

The height of the isolation wall 13 is greater than the height of the light-emitting element 12, so that the isolation wall 13 plays a role of supporting, and the isolation wall 13 is in contact with the diffusion plate 40 or the isolation plate in the subsequent process to support the diffusion plate 40 or the isolation plate above the light-emitting element 12, so that the damage to the surface of the light-emitting element 12, i.e., the LED beads, by the diffusion plate 40 or the isolation plate in the subsequent process can be avoided, and the production yield can be improved.

The backlight assembly 10 may extend in X-direction and/or Y-direction. It may be understood that the backlight assembly 10 extends on the surface formed by the X-direction and Y-direction where the X-direction and Y-direction are perpendicular to each other. In the present disclosure, Z-direction may be perpendicular to the X-direction and perpendicular to the Y-direction.

It may also be understood that the Z-direction may be perpendicular to the surface formed by the X-direction and Y-direction. It should be noted that in the present disclosure, the X-direction, Y-direction, and Z-direction are used to indicate relative positional directions, and the X-direction, Y-direction, and Z-direction are not limited to the specific directions shown in the drawings, depending on the different usage states of the backlight assembly 10.

In this embodiment, first direction is the Z-direction. Along the Z-direction, the light-emitting element 12 is disposed on the substrate 11. If one surface of the backlight assembly 10 that emits light is defined as the light-emitting surface, then the light-emitting element 12 is disposed on the light-emitting surface of the substrate 11.

In the present disclosure, the substrate 11 may be a Printed Circuit Board (PCB), and the Printed Circuit Board may be a rigid circuit board or a flexible circuit board. The material of the flexible circuit board is not limited in the present disclosure and may be an organic polymer, and as an example, the organic polymer may be one of Polyimide (PI), Polyamide (PA), Polycarbonate (PC), Polyphenylene Ether Sulfone (PES), Polyethylene Terephthalate (PET), polyethylene naphthalate (PEN), Polymethyl Methacrylate (PMMA) and Cyclic Olefin Copolymer (COC).

The light-emitting element 12 may be an LED chip (Light Emitting Diode), used to emit light. The light-emitting element 12 may be mounted on the light-emitting surface of the substrate 11 through adhesive, and the light-emitting element 12 may also be fixed on the substrate 11 through thermal epoxy resin. In the present disclosure, the light-emitting element 12 may be a chip or lamp bead that emits blue light, or may be a chip or lamp bead that emits green light or red light, which is not specifically limited here.

Figure 3:
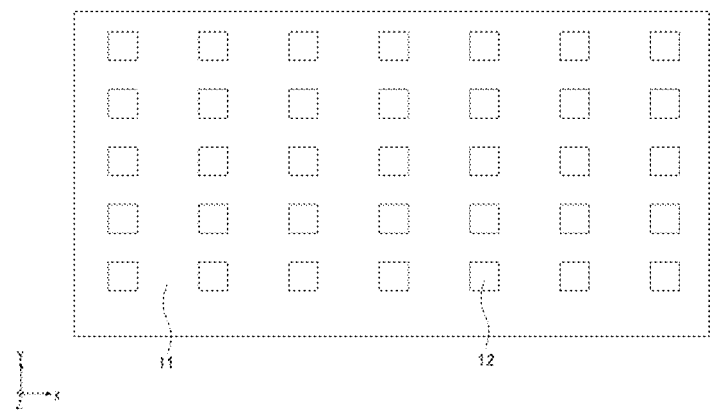
FIG. 3 is a schematic diagram illustrating an arrangement of a plurality of light-emitting elements on a substrate according to an exemplary embodiment.

In one embodiment, FIG. 3 is a schematic diagram illustrating an arrangement of plurality of light-emitting elements 12 on a substrate 11 according to an exemplary embodiment. As shown in FIG. 3, a plurality of light-emitting elements 12 are arranged in an array on the substrate 11. That is, a plurality of light-emitting elements 12 equally spaced are provided in the X-direction, a plurality of light-emitting elements 12 equally spaced are provided in the Y-direction, and two adjacent light-emitting elements 12 are aligned in the X-direction or the Y-direction.

Figure 4:
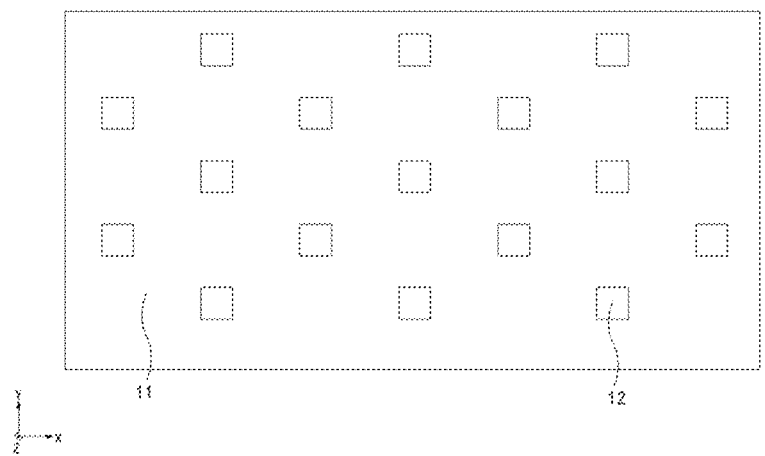
FIG. 4 is a schematic diagram illustrating an arrangement of a plurality of light-emitting elements on a substrate according to another exemplary embodiment.

In one embodiment, FIG. 4 is a schematic diagram illustrating the arrangement of plurality of light-emitting elements 12 on a substrate 11 according to another exemplary embodiment. As shown in FIG. 4, a plurality of light-emitting elements 12 are arranged in a staggered arrangement on the substrate 11. That is, plurality of rows of light-emitting elements 12 parallel but staggered are provided along the Y-direction, and the distance between two adjacent rows along the Y direction may be equal or unequal. Wherein, the distance between the light emitting elements 12 in the X-direction is equal.

Figure 5:
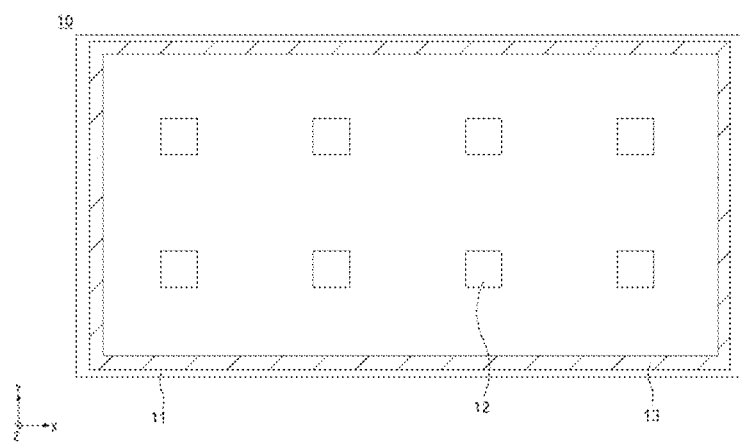
FIG. 5 is a schematic diagram illustrating a structure of an isolation wall on a substrate according to an exemplary embodiment.

In one embodiment, FIG. 5 is a schematic diagram illustrating a structure of an isolation wall 13 on a substrate 11 according to an exemplary embodiment. As shown in FIG. 5, the isolation wall 13 is in the shape of a surrounding wall, and may be disposed at the edges of all the light-emitting elements 12. For example, in one embodiment, assuming that the outline of the substrate 11 is rectangular, the isolation walls 13 are also in the shape of a rectangular frame, and disposed at the edges of the substrate 11 along the X-direction and the Y-direction, and surround the plurality of light emitting elements 12.

In some embodiments, the isolation wall 13 is disposed between adjacent light-emitting elements 12 to isolate the adjacent light-emitting elements 12.

An isolation wall 13 is also provided between two adjacent light-emitting elements 12 or four light-emitting elements 12, when the isolation wall 13 is in contact with the diffusion plate 40 or the isolation plate, a position for supporting the diffusion plate 40 or the isolation plate may be increased, a bearing capacity of the isolation wall 13 is increased. The isolation walls 13 are uniformly provided between the plurality of light-emitting elements 12 such that the diffusion plate 40 or the isolation plate may be subjected to a uniform force, localized deformation or collapse of the diffusion plate 40 or the isolation plate, which may affect the light-emitting quality of the light-emitting elements 12, maybe avoided.

In one embodiment, the isolation wall 13 may only include an inner isolation wall 13, or the isolation wall 13 may include both an outer isolation wall 13 and an inner isolation wall 13. The outer isolation wall 13 surrounds all the light-emitting elements 12, and the inner isolation wall 13 may be disposed between the plurality of light-emitting elements 12. The inner isolation wall 13 may have a columnar structure or a plate-like structure.

Figure 6A:
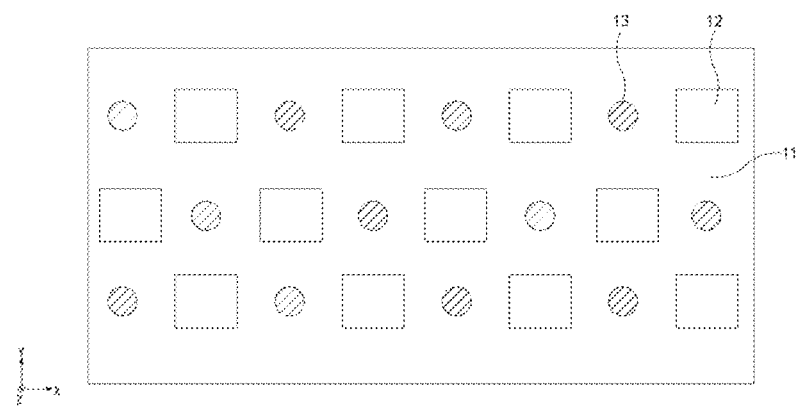
FIG. 6a, FIG. 6b, and FIG. 6c are schematic diagrams illustrating structures of an isolation wall on a substrate according to another exemplary embodiment.
Figure 6B:
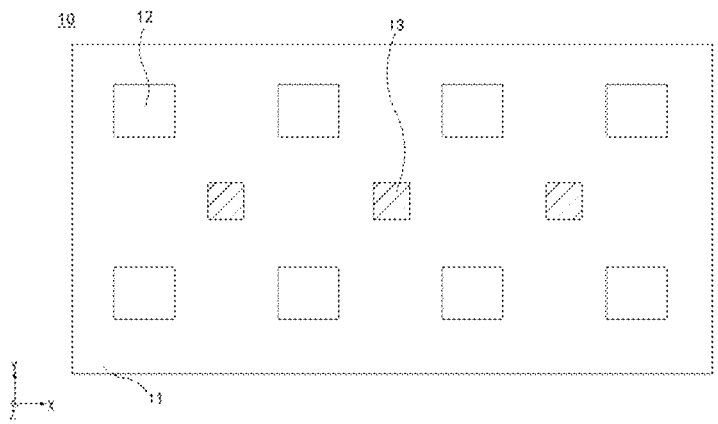
Figure 6C:
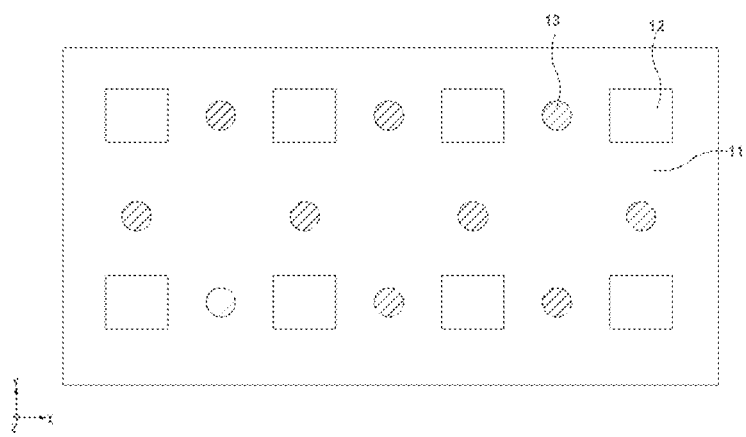

FIG. 6a, FIG. 6b, and FIG. 6c are schematic diagrams illustrating structure of an isolation wall on a substrate according to another exemplary embodiment. As shown in FIG. 6a to FIG. 6c, the plurality of isolation walls 13 are provided and have a columnar structure or plate-like structure. The isolation wall 13 may be disposed at a center of a square or diamond formed by the line connecting center points of four adjacent light-emitting elements 12 (as shown in FIG. 6a and FIG. 6b), or the isolation wall 13 may also be disposed at the midpoint of a line connecting the center points of two adjacent light-emitting elements 12 (as shown in FIG. 6c)

It should be noted that the cross-sectional shape of the isolation wall 13 shown in FIG. 6a, FIG. 6b, and FIG. 6c is only exemplary, and is not used to limit the protection scope of the present disclosure. The cross section of the isolation wall 13 with a columnar shape may be in any shape such as square, circle, diamond, etc., and is not limited to the shapes shown in FIG. 6a, FIG. 6b, and FIG. 6c. In addition, when the cross-section of the isolation wall 13 is rectangular shape, the isolation wall 13 is disposed in a plate shape.

Figure 7A:
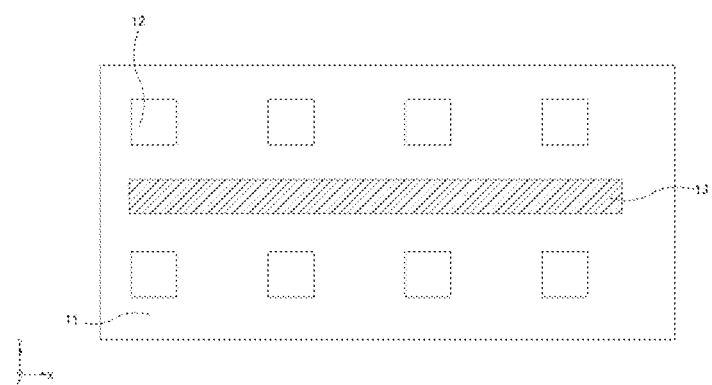
FIG. 7a, FIG. 7b, and FIG. 7c are schematic diagrams illustrating structures of an isolation wall on a substrate according to yet another exemplary embodiment.
Figure 7B:
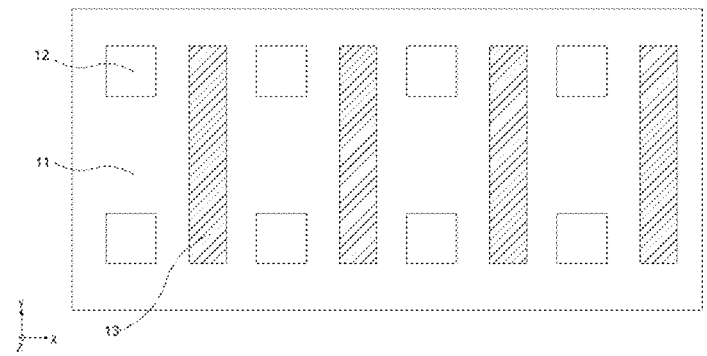
Figure 7C:
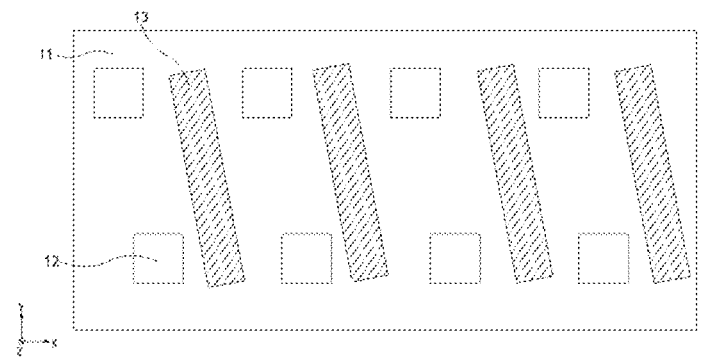

FIG. 7a, FIG. 7b, and FIG. 7c are schematic diagrams illustrating structure of an isolation wall on a substrate according to yet another exemplary embodiment. As shown in FIG. 7a to FIG. 7c, a plurality of isolation walls 13 are provided, and the isolation walls 13 have a plate-like structure, the plurality of isolation walls 13 are disposed in parallel. The isolation wall 13 may be disposed between two rows of light-emitting elements 12 along the X-direction (as shown in FIG. 7a), also may be disposed between two columns of light-emitting elements 12 along the Y-direction (as shown in FIG. 7b), or when the light-emitting elements 12 are arranged in a staggered manner, the isolation wall 13 may be disposed at an incline (as shown in FIG. 7c).

It should be noted that the positions of the isolation wall 13 shown in FIG. 7a, FIG. 7b, and FIG. 7c are only exemplary and are not used to limit the protection scope of the present disclosure. The isolation walls 13 with a plate-like structure may be disposed between two adjacent rows or columns, or two or more rows of light-emitting elements 12 may be spaced between the two isolation walls 13.

In FIG. 6a, FIG. 6b, and FIG. 6c and in FIG. 7a, FIG. 7b, and FIG. 7c, an outer isolation wall 13 (such as the isolation wall 13 shown in FIG. 5) may also be provided. In FIG. 7a, FIG. 7b, and FIG. 7c, the inner plate-shaped isolation wall may not be connected to the outer isolation wall, also may be connected to the outer isolation wall, or may be integrated with the outer isolation wall.

Figure 8:
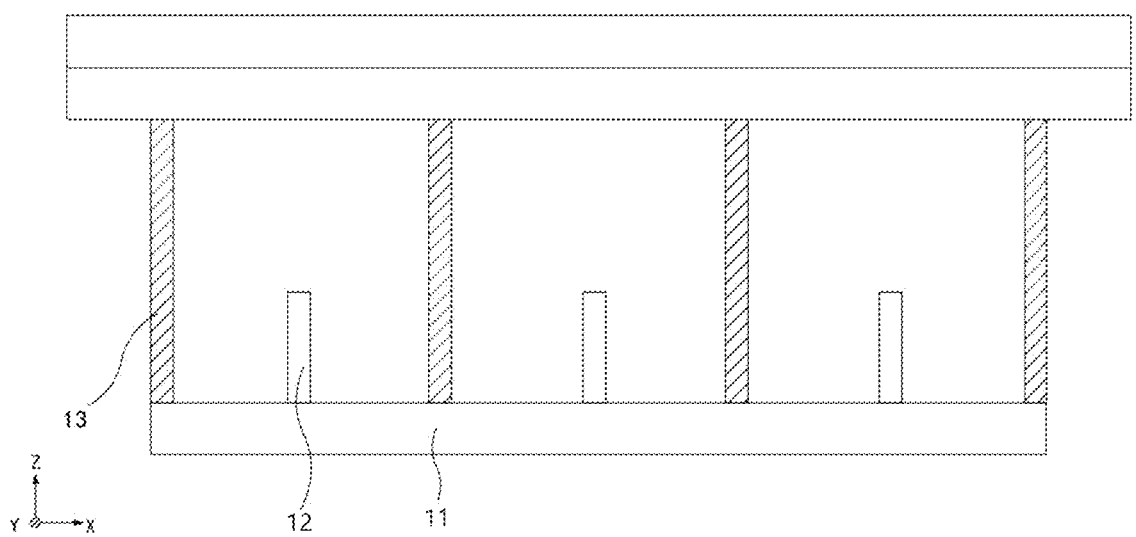
FIG. 8 is a schematic diagram illustrating a combination of a backlight assembly and a diffusion plate and an isolation plate in a Z direction according to an exemplary embodiment.

FIG. 8 is a schematic diagram illustrating the combination of backlight assembly 10 and diffusion plate 40 and isolation plate in the Z direction according to an exemplary embodiment. As shown in FIG. 8, in the Z-direction, a height of the isolation wall 13 is greater than a height of the light-emitting element 12. In the subsequent process, it is assumed that an end of the isolation wall 13 away from the substrate 11 is an upper end, the upper end of the isolation wall 13 is in contact with the diffusion plate 40 or the isolation plate, which plays the role of supporting the diffusion plate 40 or the isolation plate, and supporting of the diffusion plate 40 or the isolation plate above the light-emitting element 12, may avoid the damage of the light-emitting surface of the light-emitting element 12 caused by the diffusion plate 40 or the isolation plate in the subsequent process, and the production yield maybe improved.

In some embodiments, the isolation walls 13 form a plurality of accommodating cavities 14 on the substrate 11, and the accommodating cavities 14 surround the light-emitting element 12. In one embodiment, one light-emitting element 12 is disposed in one accommodating cavity 14. In another embodiment, one accommodating cavity 14 surrounds two or more light-emitting elements 12.

When a plurality of light-emitting elements 12 are surrounded in one accommodating cavity 14, the isolation walls 13 may be arranged at equal intervals or symmetrically distributed on the substrate 11, so that the diffusion plate 40 or the isolation plate is applied by a uniform force, and a localized deformation or collapse of the diffusion plate 40 or the isolation plate is avoided, which may affect the light-emitting quality of the light-emitting elements 12.

In some embodiments, in a cross-section perpendicular to the first direction, the accommodation cavity 14 is in the shape of any one or several combinations of rectangular, circular, rhombus, polygon. That is, on a cross-section perpendicular to the Z direction and parallel to the plane where the X-direction and the Y-direction are located, the accommodation cavity 14 may be in any one or several combinations of rectangular, circular, elliptical, rhombus or polygonal shapes.

The backlight assembly 10 will be described below through six embodiments. Wherein, Embodiment 1 to Embodiment 3 are embodiments enumerated on the basis of the plurality of light-emitting elements 12 being distributed in an array on the substrate 11. Embodiment 4 to Embodiment 6 are embodiments enumerated on the basis that the plurality of light-emitting elements 12 are staggeredly distributed on the substrate 11.

Embodiment 1

Figure 9:
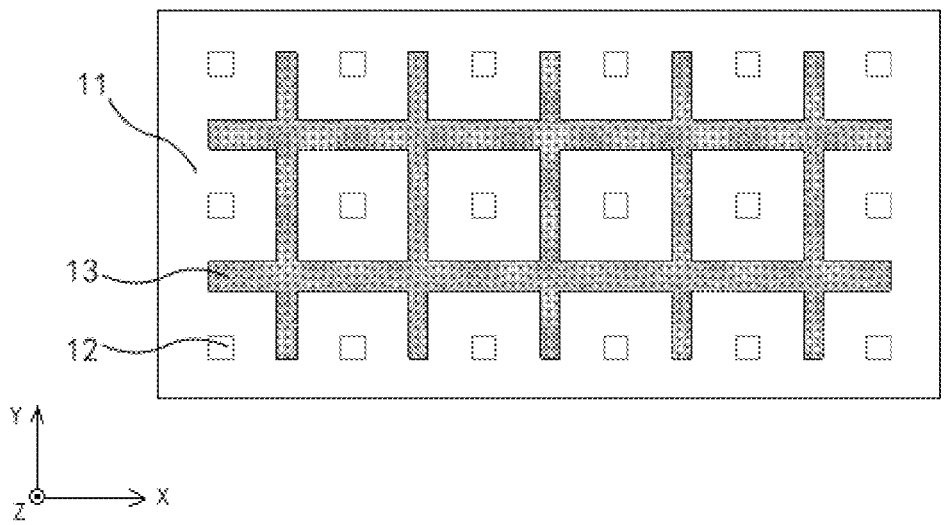
FIG. 9 is a schematic top view illustrating a structure of a backlight assembly according to Embodiment 1.

FIG. 9 is a schematic top view illustrating a structure of a backlight assembly according to Embodiment 1. As shown in FIG. 9, the backlight assembly of the present disclosure includes a substrate 11, a plurality of light-emitting elements 12 and an isolation wall 13. The plurality of light-emitting elements 12 are disposed apart from each other on the substrate 11 and arranged in an array, and the isolation wall 13 has a grid-like structure.

In the Embodiment 1, in the cross-section perpendicular to the Z-direction, the shape of the accommodation cavity 14 formed by the isolation wall 13 on the substrate 11 is rectangular, and one light-emitting element 12 is disposed in each of the accommodation cavities 14. In this embodiment, when the interval of the plurality of light-emitting elements 12 in the X-direction is equal to the interval in the Y-direction, the accommodation cavity 14 formed by the isolation wall 13 on the substrate 11 is square. When the interval of the plurality of light-emitting elements 12 in the X-direction is not equal to the interval in the Y-direction, the cross-section of the accommodation cavity 14 formed by the isolation wall 13 on the substrate 11 is rectangular.

Embodiment 2

Figure 10:
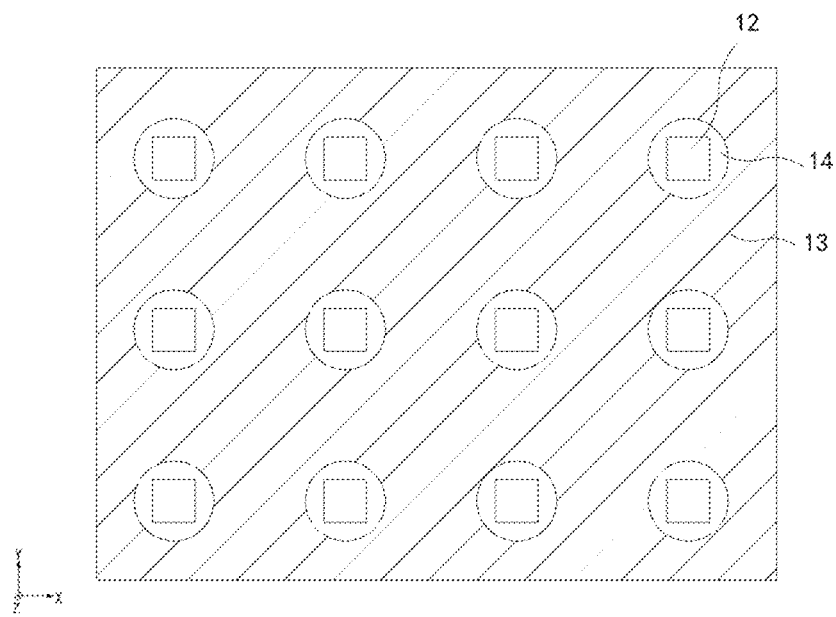
FIG. 10 is a schematic top view illustrating a structure of a backlight assembly according to Embodiment 2.

FIG. 10 is a schematic top view illustrating a structure of a backlight assembly 10 according to Embodiment 2. As shown in FIG. 10, the backlight assembly of the present disclosure includes a substrate 11, a plurality of light-emitting elements 12 and an isolation wall 13. A plurality of light-emitting elements 12 are spaced apart from each other on the substrate 11 and arranged in an array.

In the Embodiment 2, in the cross-section perpendicular to the Z-direction, the shape of the accommodation cavity 14 formed by the isolation wall 13 on the substrate 11 is circular or elliptical, and one light-emitting element 12 is disposed in each of the accommodation cavities 14. When the accommodation cavity 14 is elliptical, one or more light-emitting elements 12 may be disposed in each of elliptical accommodation cavities 14.

Embodiment 3

Figure 11:
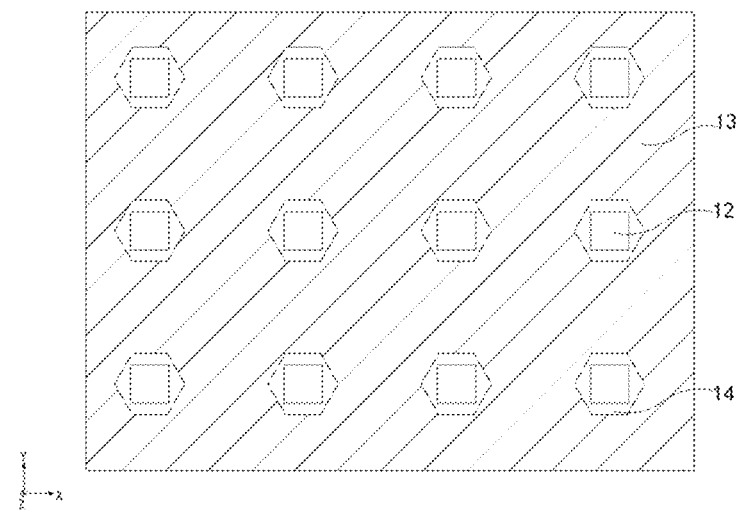
FIG. 11 is a schematic top view illustrating a structure of a backlight assembly according to Embodiment 3.

FIG. 11 is a schematic top view illustrating a structure of a backlight assembly 10 according to Embodiment 3. As shown in FIG. 11, the backlight assembly of the present disclosure includes a substrate 11, a plurality of light-emitting elements 12 and an isolation wall 13. A plurality of light-emitting elements 12 are spaced apart from each other on the substrate 11 and arranged in an array.

In the Embodiment 3, in the cross-section perpendicular to the Z-direction, the shape of the accommodation cavity 14 formed by the isolation wall 13 on the substrate 11 may be a pentagon, a hexagon or other polygons, and one light-emitting element 12 is disposed in each of the accommodation cavities 14. The accommodation cavity 14 shown in FIG. 11 is hexagonal.

Embodiment 4

Figure 12:
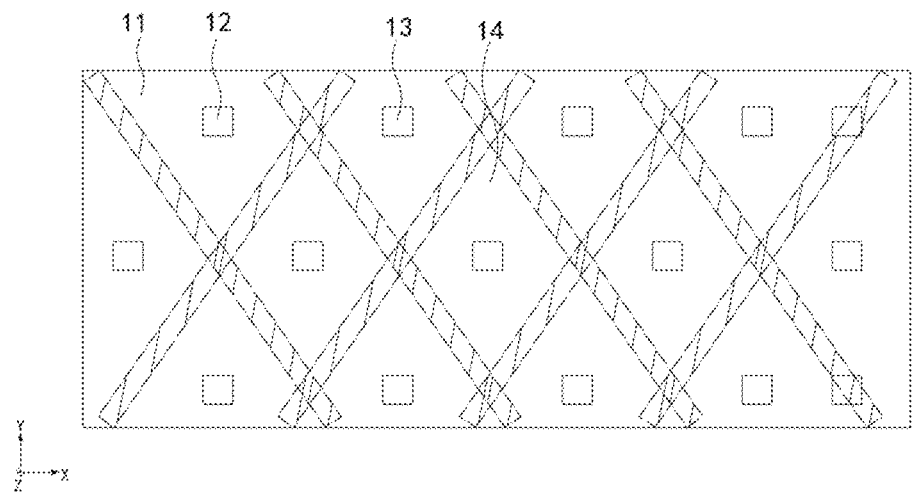
FIG. 12 is a schematic top view illustrating a structure of a backlight assembly according to Embodiment 4.

FIG. 12 is a schematic top view illustrating a structure of a backlight assembly according to Embodiment 4. As shown in FIG. 12, the backlight assembly of the present disclosure includes a substrate 11, a plurality of light-emitting elements 12 and an isolation wall 13. A plurality of light-emitting elements 12 are spaced apart from each other on the substrate 11 and arranged in a staggered manner, and the isolation wall 13 has a grid-like structure.

In the Embodiment 4, in the cross-section perpendicular to the Z-direction, the shape of the accommodation cavities 14 formed by the isolation wall 13 on the substrate 11 is a rhombus, and one light-emitting element 12 is disposed in each of the accommodation cavities 14.

Embodiment 5

Figure 13:
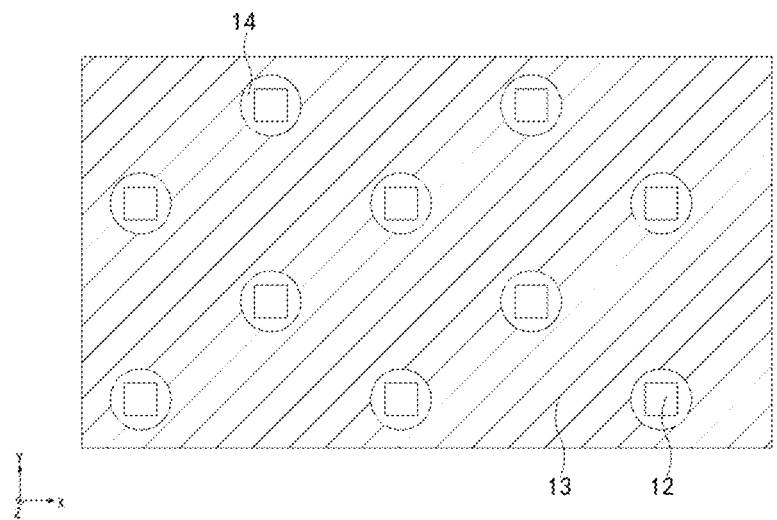
FIG. 13 is a schematic top view illustrating a structure of a backlight assembly according to Embodiment 5.

FIG. 13 is a schematic top view illustrating a structure of a backlight assembly according to Embodiment 5. As shown in FIG. 13, the backlight assembly of the present disclosure includes a substrate 11, a plurality of light-emitting elements 12 and an isolation wall 13. A plurality of light-emitting elements 12 are spaced apart from each other on the substrate 11 and arranged in a staggered manner.

In the Embodiment 5, in the cross-section perpendicular to the Z-direction, the shape of the accommodation cavity 14 formed by the isolation wall 13 on the substrate 11 is circular or elliptical, and one light-emitting element 12 is disposed in each of the accommodation cavities 14. The accommodation cavity 14 may be elliptical, and one or more light-emitting elements 12 may be disposed in each of elliptical accommodation cavities 14.

Embodiment 6

Figure 14:
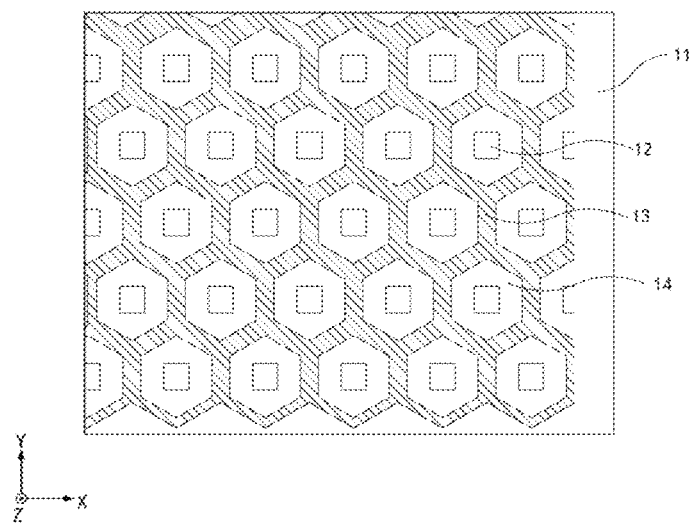
FIG. 14 is a schematic top view illustrating a structure of a backlight assembly according to Embodiment 6.

FIG. 14 is a schematic top view illustrating a structure of a backlight assembly according to Embodiment 6. As shown in FIG. 14, the backlight assembly of the present disclosure includes a substrate 11, a plurality of light-emitting elements 12 and an isolation wall 13. A plurality of light-emitting elements 12 are spaced apart from each other on the substrate 11 and arranged in a staggered manner.

In the Embodiment 6, in the cross-section perpendicular to the Z-direction, the shape of the accommodation cavity 14 formed by the isolation wall 13 on the substrate 11 may be a pentagon, a hexagon or other polygons, and one light-emitting element 12 is disposed in each of the accommodation cavities 14. The accommodation cavity 14 shown in FIG. 14 is hexagonal.

It should be noted that, in a cross-section perpendicular to the Z-direction, the above-described shape of the accommodation cavity 14 formed by the above isolation wall 13 on the substrate 11 is only exemplary and is not intended to limit the protection scope of the present disclosure. In the present disclosure, in the Z-direction, as long as the height of the isolation wall 13 is greater than the height of the light-emitting element 12 and is spaced apart from the light-emitting element 12, it is sufficient that the isolation wall 13 may serve to support the diffusion plate 40 or the isolation plate in the subsequent process.

The height of the isolation wall 13 in the Z-direction is greater than the height of the light-emitting element 12. The isolation wall 13 may play a supporting role, so that the isolation wall 13 supports the diffusion plate 40 or isolation plate above the light-emitting element 12, which can avoid damage to the surface of the light-emitting element 12, i.e., the LED lamp bead, by the diffusion plate 40 or the isolation plate in the subsequent process, and improve the production yield.

In addition, it should also be noted that the isolation wall 13 disclosed in Embodiment 1 to Embodiment 6 may be an integral structure, or may be spliced by the plurality of sub-isolation walls 13. The isolation wall 13 formed of an integrated structure or spliced together has a simple structure, is easy to be mounted, has low technical requirements, and saves costs.

In some embodiments, the sidewall of the isolation wall 13 is perpendicular to the substrate 11. The sidewall of the isolation wall 13 is perpendicular to the substrate 11 so that all the light emitted from the light-emitting element 12 is emitted along the Z-direction. At this time, the shape of the accommodation cavity 14 formed by the isolation wall 13 on the substrate 11 may be a cylindrical shape, a square column shape, a rhombus shape or a polygonal column shape.

In some embodiments, the sidewall of the isolation wall 13 is inclined to the substrate 11. When the sidewall of the isolation wall 13 is inclined to the substrate 11, on the longitudinal-section parallel to the first direction and/or the second direction (i.e., X-direction or Y-direction), the sidewall of the isolation wall 13 is in any one or several combinations of rectilinear, curved, and stepped shapes. When the sidewall of the isolation wall 13 is rectilinear in shape, the sidewall of the isolation wall 13 may be at an obtuse or acute angle to the substrate 11.

It should be noted that it is possible that in the longitudinal-section parallel to the first direction (i.e., the X-direction), the sidewall of the isolation wall 13 is in any one or several combinations of a rectilinear, curved, and stepped shapes. It is also possible that in the longitudinal-section parallel to the second direction (i.e., the Y-direction), the sidewall of the isolation wall 13 is in any one or several combinations of a rectilinear, curved, and stepped shapes. It is also possible that in the longitudinal-section in both the first direction and the second direction, the sidewall of the isolation wall 13 is simultaneously in any one or several combinations of rectilinear, curved, and stepped shapes, without being specifically limited herein.

In some embodiments, the solation wall 13 is in the form of a narrowed width at the end. The narrowing of the width of the end of the isolation wall 13 avoids obstruction of the light emitted from the light-emitting element 12 by the isolation wall 13. That is, the sidewall of the isolation wall 13 is inclined, which can make the light emitted from the light-emitting elements 12 in the accommodation cavity 14 in a divergent shape. The light emitted from two adjacent light-emitting elements 12 are both in a divergent shape, and when the light reaches the upper end of the isolation wall 13, the two beams of light are cross-enhanced, so that the obstruction of the light emitted by the light-emitting elements 12 by the isolation wall 13 may be avoided.

FIG. 15a, FIG. 15b, FIG. 15c, and FIG. 15d are schematic cross-sectional views illustrating structures of an isolation wall 13 according to an exemplary embodiment.

Figure 15A:
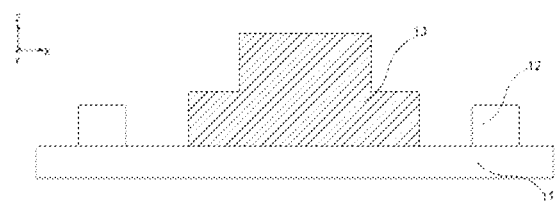
FIG. 15a, FIG. 15b, FIG. 15c, and FIG. 15d are schematic cross-sectional views illustrating structures of an isolation wall according to an exemplary embodiment.
Figure 15B:
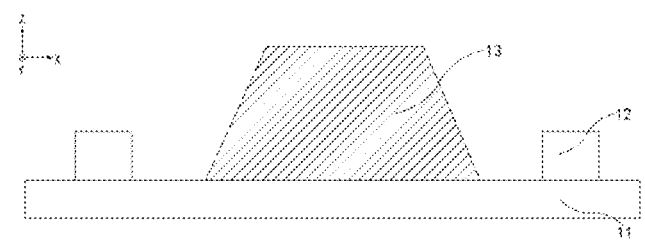

In the longitudinal-section parallel to the X-direction, the sidewall of the isolation wall 13 is stepped (as shown in FIG. 15a). If the sidewall of the isolation wall 13 is linear, the isolation wall 13 will be triangular or trapezoidal (as shown in FIG. 15b) in the longitudinal-section parallel to the X-direction.

Figure 15C:
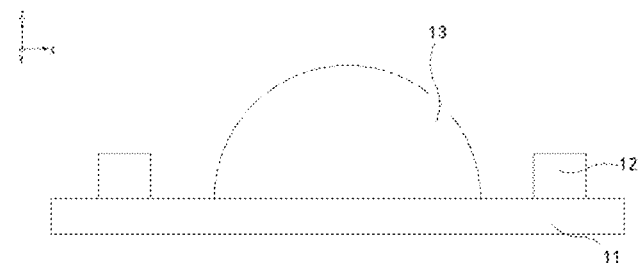
Figure 15D:
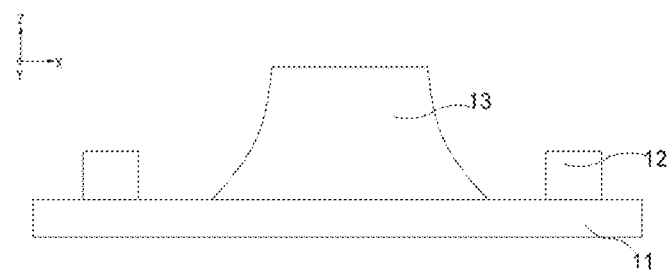

In the longitudinal-section parallel to the X-direction, the sidewall of the isolation wall 13 is curved. The curved sidewall may be bent in a direction close to the surrounded light-emitting element 12. At this time, the longitudinal-section of the isolation wall 13 parallel to the X-direction is semicircular (as shown in FIG. 15c). The curved sidewall may be bent in a direction away from the surrounded light-emitting element 12. At this time, the longitudinal-section of the isolation wall 13 parallel to the X-direction is volcano-shaped (as shown in FIG. 15d).

In addition, in the plane parallel to the X-direction and the Y-direction, the isolation wall 13 is horizontal, that is, the upper end of the semicircle or volcano-shaped is a linear. This makes it easier for the upper end of the isolation wall 13 to fit with the diffusion plate 40 or the isolation plate, and the fit is more stable.

In some embodiments, the isolation wall 13 includes transparent insulating material, or the isolation wall 13 is a reflective material. When the sidewall of the isolation wall 13 is perpendicular to the substrate 11 or the angle between the sidewall of the isolation wall 13 and the substrate 11 forms an acute angle, the isolation wall 13 includes transparent insulating material. The transparent isolation wall 13 may avoid blocking the light emitted from the light-emitting element 12 and avoid forming black shadows on the isolation wall 13.

In some embodiments, when the angle between the sidewall of the isolation wall 13 and the substrate 11 is an obtuse angle, the isolation wall 13 includes a reflective material. Specifically, the isolation wall 13 including reflective material may reflect the light emitted from the light-emitting element 12 to the maximum extent, thereby avoiding the obstruction of the light emitted from the light-emitting element 12 by the isolation wall 13 and having little impact on the light emitted by the light-emitting element 12.

Furthermore, the isolation wall 13 may include insulating material. The isolation wall 13 including insulating material can avoid the generation of electromagnetism, thereby further avoiding the impact on the light-emitting quality of the light-emitting element 12.

Furthermore, when the angle between the sidewall of the isolation wall 13 and the substrate 11 is an obtuse angle, the color of the isolation wall 13 may be matched according to the color of the light emitted from the light-emitting element 12. When the light-emitting element 12 is a chip or lamp bead that may emit blue light, the isolation wall 13 may be blue. When the light-emitting element 12 is a chip or lamp bead that may emit green light, the isolation wall 13 may be green. When the light-emitting element 12 is a chip or lamp bead that may emit red light, the isolation wall 13 may be red.

Of course, the isolation wall 13 may also be set to white, or the color of the isolation wall 13 may be set according to a preset color generated by superposing the color of the isolation wall 13 and the color of the light emitted from the light-emitting element 12. There is no specific limitation here either.

In some embodiments, the isolation wall 13 is injection molded and fixed to the substrate 11 through adhesive or shaft holes. In some embodiments, the isolation wall 13 includes a thermosetting material, and the isolation wall 13 is directly fixed to the substrate 11 by thermally curing the thermosetting material.

It can be understood that, in order to implement the above functions, the backlight assembly provided by the embodiment of the present disclosure includes corresponding hardware structures and/or software modules for performing each function. Combined with the units and algorithm steps of each example disclosed in the embodiments of the present disclosure, the embodiments of the present disclosure can be implemented in the form of hardware or a combination of hardware and computer software. Whether a function is performed by hardware or computer software driving the hardware depends on the specific application and design constraints of the technical solution. Those skilled in the art may use different methods to implement the described functions for each specific application, but such implementation should not be considered to go beyond the scope of the technical solutions of the embodiments of the present disclosure.

Based on the same concept, embodiments of the present disclosure also provide a display device. In addition, the display device may be a display device of a mobile phone, a computer, a digital broadcast terminal, a messaging device, a game console, a tablet device, a medical device, a fitness device, a personal digital assistant, a translator, a wearable device such as a watch, a bracelet, and the like.

In the present disclosure, the term "display device" is not limited to the content defined by the word and may also be referred to as a "display panel", "display apparatus" or "display screen", and the like.

In the present disclosure, the display device may be a liquid crystal display (LCD), which uses a liquid crystal solution in two pieces of polarized materials. When an electric current passes through the liquid, the crystals will be rearranged to produce an image.

The display device 100 of the present disclosure includes a backlight assembly 10 and a display module 20. The display module 20 has a display surface for displaying an image; the backlight assembly 10 is disposed in a back direction of the display module 20 opposite the display surface. In addition, the backlight assembly includes: a substrate; a plurality of light-emitting elements for emitting light, the plurality of light-emitting elements spaced apart from each other on the substrate; and an isolation wall disposed on the substrate, wherein, on the substrate, the light-emitting elements and the isolation wall are disposed on the same side and spaced apart from each other; the height of the isolation wall is greater than the height of the light-emitting element in the first direction as a direction of thickness of the substrate.

In the present disclosure, the LCD may be driven by any of the three driving methods: Static, Simple Matrix, or Active Matrix. Among them, the passive matrix type may be further divided into Twisted Nematic (TN), Super Twisted Nematic (STN), and other passive matrix-driven liquid crystal displays; while the active matrix type may be broadly distinguished to be two methods: Thin Film Transistor (TFT) and Metal/Insulator/Metal (MIM).

Figure 16:
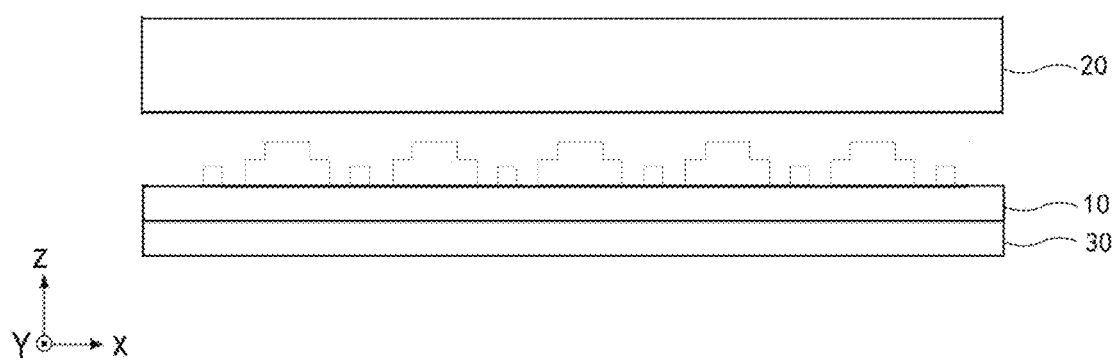
FIG. 16 is a schematic cross-sectional view illustrating a structure of a display device according to an exemplary embodiment.

As shown in FIG. 16, the display device 100 of the present disclosure may further include a circuit board 30, the circuit board 30 is disposed on a side of the backlight assembly 10 away from the display module 20. As shown in FIG. 16, the circuit board 30 may be disposed below the backlight assembly 10.

In the present disclosure, the backlight assembly 10 may be electrically connected to the circuit board 30. The circuit board 30 may be provided with functional units such as a control unit, a receiving unit, and an output unit. These functional units may control the turn-on and turn-off of the plurality of light-emitting elements 12 on the backlight assembly 10, as well as the timings of the turn-on and turn-off of the light-emitting elements 12.

In the present disclosure, the circuit board 30 may be a main board of the display device 100 or a small board of the display device 100. The circuit board 30 may be used to control the backlight assembly 10. Alternatively, the circuit board 30 may also be electrically connected to the display module 20. The functional units on the circuit board 30 may also be used to control the display module 20, for example, the display module 20 may be controlled to display a picture, and/or the display module 20 may be controlled to control a corresponding image.

It should be noted that in the present disclosure, the display device 100 may include a variety of different elements and is not limited to the elements exampled in the present disclosure. For example, in some embodiments, the display device 100 may further include a light-shielding component. The light-shielding component is disposed on the side surface of the backlight assembly 10 for preventing the light emitted from the backlight assembly 10 from leaking out, avoiding interference with the display screen of the display module 20 due to the light leaking out.

In the present disclosure, the light-shielding component may be a light-shielding plate or a functional layer with a light-shielding function coated on the side surface of the backlight assembly 10. The present disclosure does not impose any specific limitations as long as the corresponding purpose can be achieved.

Figure 17:
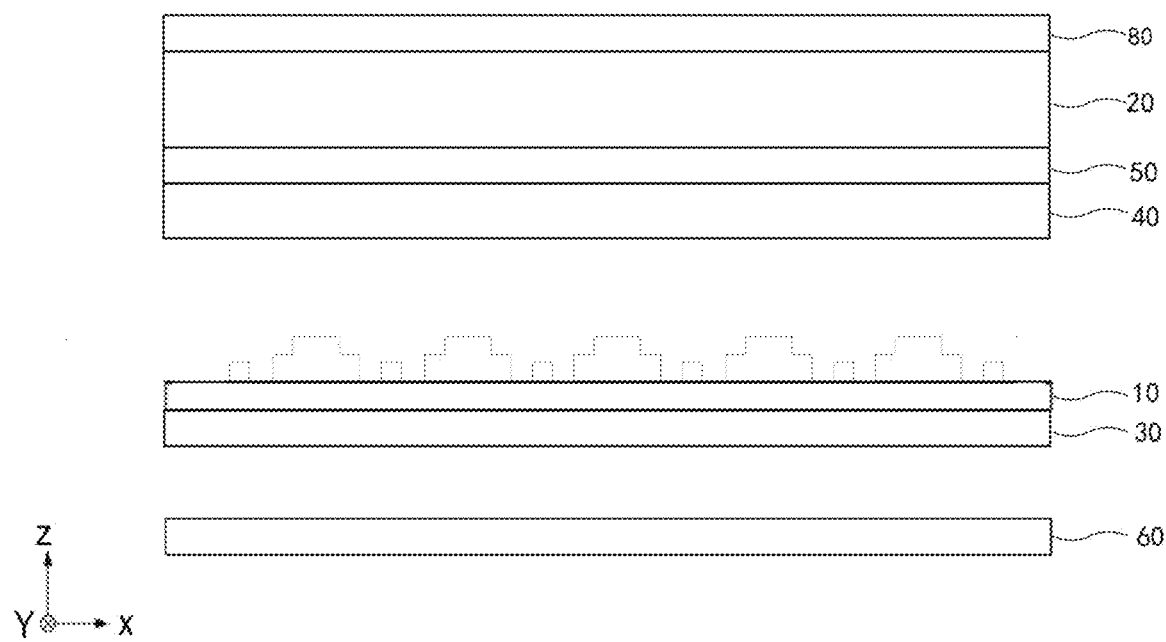
FIG. 17 is a schematic cross-sectional view illustrating a structure of a display device according to another exemplary embodiment.

In the present disclosure, the display device 100 may also include other components. FIG. 17 is a schematic cross-sectional view illustrating a structure of a display device according to another exemplary embodiment. As shown in FIG. 17, the display device 100 may further include a diffusion plate 40, and the diffusion plate 40 is disposed between the display module 20 and the backlight assembly 10, the display device 100 may further include an isolation plate (not shown), the isolation plate is disposed between the diffusion plate 40 and the backlight assembly 10.

As shown in FIG. 17, the diffusion plate 40 may be disposed below the display module 20 and disposed above the backlight assembly 10. The diffusion plate 40 may also be called a diffusion sheet, is used to provide a uniform surface light source for the display device 100. That is, the diffusion plate 40 may make the light emitted from the backlight assembly 10 more uniform, thereby providing a more uniform light source for the display device 100, thereby improving the display quality of the display device 100.

Specifically, the diffusion plate 40 may also be a light guide plate, a light guide layer, or other components with a light uniformity function. The diffusion plate 40 of the present disclosure may be a polycarbonate diffusion plate, also known as PC light diffusion plate, PC uniform light plate, PC diffuse reflection plate, etc. In this case, the base material of the diffusion plate 40 is polycarbonate (PC).

As shown in FIG. 17, in the present disclosure, the display device 100 may further include an optical film 50, and the optical film 50 is disposed between the display module 20 and the diffusion plate 40.

As shown in FIG. 17, the optical film 50 may be disposed above the diffusion plate 40, for example, it may be attached to the upper surface of the diffusion plate 40. The optical film 50 may include one or more of a diffusion sheet, a reflective sheet, a light guide plate, a prism sheet, and the like. Specific settings can be made according to the different needs of different display devices.

It should be noted that the display device 100 in FIG. 17 includes both a diffusion plate 40 and an optical film 50, and the diffusion layer is disposed below the optical film 50, however, the present disclosure is not limited thereto, In some embodiments, the display device 100 may also include only one of the diffusion plate 40 and the optical film 50. Alternatively, the display device 100 may include both the diffusion plate 40 and the optical film 50, but the diffusion plate 40 is disposed above the optical film 50, as long as the purpose can be achieved.

As shown in FIG. 17, the display device 100 of the present disclosure may also include a middle frame 60. The middle frame 60 may be a bracket inside the display device 100 to provide support for the circuit board 30 and other components. It should be noted that the present disclosure is not limited thereto, in other embodiments, the middle frame 60 may also be located on the surface of the display device 100, that is, the user can directly see the middle frame 60 from the outside. In this case, the middle frame 60 may also be called a back cover, a battery cover or a casing.

In the present disclosure, the backlight assembly 10 of the display device 100 may be any of the foregoing embodiments, and the description thereof will not be repeated here.

In the present disclosure, the display device 100 may be a liquid crystal display (LCD), which uses a liquid crystal solution in two pieces of polarized materials. When an electric current passes through the liquid, the crystals will be rearranged to produce an image.

In the present disclosure, the LCD may be driven by any of the three driving methods: Static, Simple Matrix, or Active Matrix. Among them, the passive matrix type may be further divided into Twisted Nematic (TN), Super Twisted Nematic (STN), and other passive matrix-driven liquid crystal displays; while the active matrix type may be broadly distinguished to be two methods: Thin Film Transistor (TFT) and Metal/Insulator/Metal (MIM).

Figure 18:
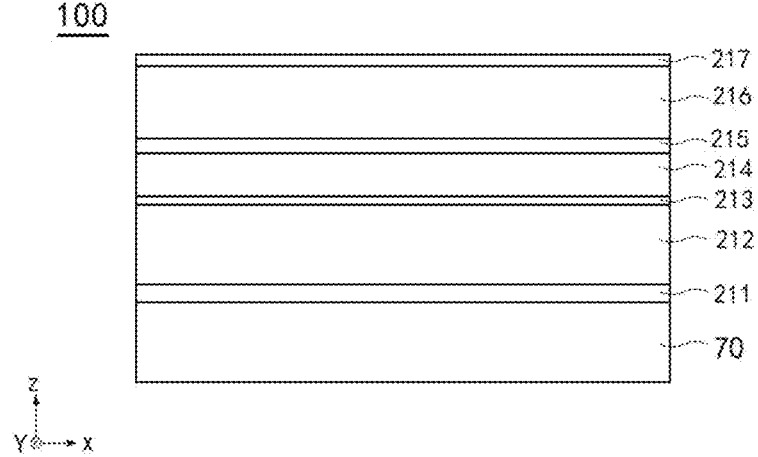
FIG. 18 is a schematic cross-sectional view illustrating a structure of a display device according to yet another exemplary embodiment.

FIG. 18 is a schematic cross-sectional view illustrating a structure of a display device according to yet another exemplary embodiment. As shown in FIG. 18, the display device 100 may include: a backlight module 70, a first polarizing plate 211 disposed on the backlight module 70, a first glass substrate 212 disposed on the first polarizing plate 211, a thin film transistor layer (TFT) 213 disposed on the first glass substrate 212, a liquid crystal layer 214 disposed on the thin film transistor layer 213, a color filter film (CF) 215 disposed on the liquid crystal layer 214, and a second glass substrate 216 disposed on the color filter film 215 and the polarizing plate 217 disposed on the second glass substrate 216.

It should be noted that in the present disclosure, the backlight module 70 is used to provide a light source for the display device 100. In some embodiments, as shown in FIG. 18, the backlight module 70 may include the backlight assembly 10. However, the present disclosure is not limited thereto, in some embodiments, the backlight assembly 10 may also directly serve as the backlight module 70. Or it may also be considered that in some cases, the backlight assembly 10 may also be called a backlight module 70.

Figure 19:
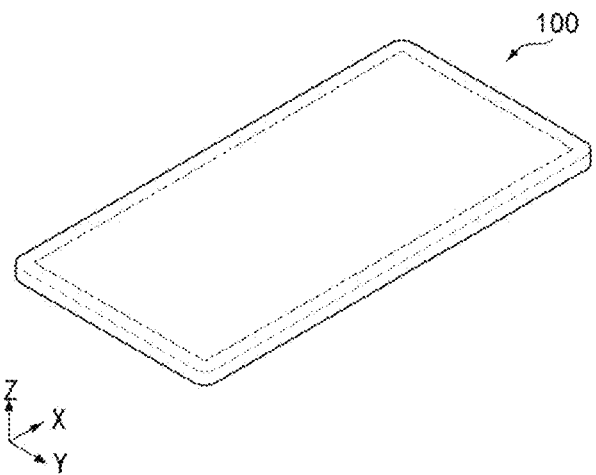
FIG. 19 is a schematic view illustrating a structure of a display device according to an exemplary embodiment.
Figure 20:
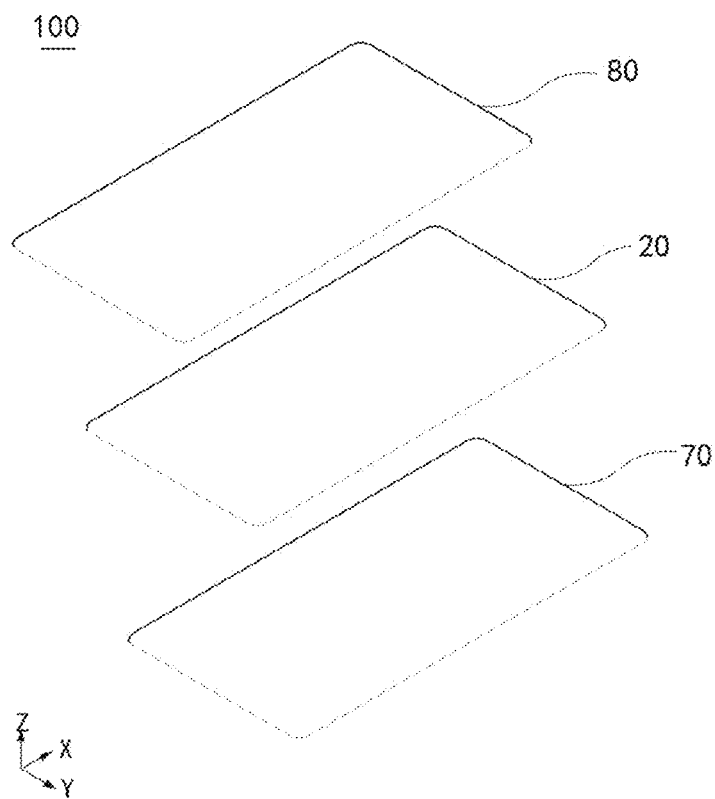
FIG. 20 is an exploded view of a display device according to an exemplary embodiment.

FIG. 19 is a schematic view illustrating a structure of a display device according to an exemplary embodiment. FIG. 20 is an exploded view of a display device according to an exemplary embodiment.

As shown in FIG. 17, FIG. 19 and FIG. 20, the display device 100 may include a cover plate 80, a display module 20 and a backlight module 70. The backlight module 70 may include any backlight assembly 10 as in the previous embodiments.

The backlight of the backlight module 70 of the display device 100 of the present disclosure is more uniform, the display effect of the display device 100 is superior.

In the present disclosure, depending on the type of the display device 100, various other elements may be included, as long as the purpose of displaying the screen can be achieved, and the present disclosure does not make any specific limitations. Specifically, for example, if the display device is a mobile electronic device, it may also include a battery.

Regarding the display device in the above embodiment, the specific manner in which each module performs operations has been described in detail in the embodiment related to the backlight assembly, and will not be described in detail here.

It may be understood that in the present disclosure, "a/the plurality of" means two or more, and other quantifiers are similar. "And/or" describes the association between associated objects, indicating that there are three possible relationships. For example, A and/or B may represent: A exists alone, A and B exist together, or B exists alone. The character "/" generally represents an "or" relationship between the associated objects before and after. The singular forms "a", "the", and "said" are also intended to include plural forms, unless the context clearly dictates otherwise.

Furthermore, it may be understood that the terms "first", "second", and others are used to describe various information, but these information should not be limited to these terms. These terms are only used to distinguish information of the same type from each other and are not indicative of a specific order or importance. In fact, "first", "second", and other expressions may be used interchangeably. For example, without departing from the scope of the present disclosure, the first information may also be called second information, and similarly, second information may also be called first information.

Furthermore, it may be understood that the terms "center", "longitudinal", "lateral", "front", "back", "above", "below", "left", "right", "vertical", "horizontal", "top", "bottom", "inside", "outside", etc. indicating the direction or positional relationship are based on the direction or position relationship shown in the drawings and are only for the convenience of description of the embodiment and simplification of the description, but are not indicative or suggestive that the referred apparatus or component must have a specific orientation and be configured and operated in a specific orientation.

Furthermore, it may be understood that unless specifically stated, "connection" includes both direct connections where there are no other components between the two and indirect connections where there are other element between the two.

Furthermore, it may be understood that although the operations are described in a specific order in the drawings in the embodiments of the present disclosure, they should not be understood as requiring the operations to be executed in the shown specific order or in a sequential order, nor that all the shown operations must be performed to achieve the desired result. In a particular environment, multitasking and parallel processing may be advantageous.

Those skilled in the art will easily conceive of other embodiments of the present disclosure after considering the description and practicing the inventions disclosed here. The present application is intended to cover any variation, use, or adaptive change of the present disclosure that follow the general principles of the present disclosure and include the common knowledge or technical means commonly used in the art that are not disclosed in the present disclosure. The description and embodiments are to be considered exemplary only, with the true scope and spirit of the present disclosure being indicated by the following claims.

It should be understood that the present disclosure is not limited to the precise structures described above and shown in the drawings and that various amendments and changes may be made without departing from its scope. The scope of the present disclosure is only limited by the appended claims.

The invention claimed is:

1. A backlight assembly, comprising:
   a substrate;
   a plurality of light emitters, wherein the plurality of light emitters are disposed on the substrate; and
   a wall disposed on the substrate, wherein:
   the wall comprises a transparent insulation material;
   the light emitters and the wall are spaced apart from each other on the substrate; and
   a height of the wall is greater than a height of at least one of the light emitters in a first direction, which is a direction of thickness of the substrate.

2. The backlight assembly of claim 1, wherein the wall is disposed between adjacent light emitters to isolate the adjacent light emitters.

3. The backlight assembly of claim 2, wherein the wall forms a plurality of accommodation cavities on the substrate, each of the accommodation cavities surrounds a respective one of the light emitters, and only one of the light emitters is disposed in each of the accommodation cavities.

4. The backlight assembly of claim 3, wherein, in a cross-section perpendicular to the first direction, at least one of the accommodation cavities is in any one or several combinations of rectangular, circular, elliptical, rhombus or polygonal shapes.

5. The backlight assembly of claim 1, wherein a side wall of the wall is perpendicular or inclined to the substrate.

6. The backlight assembly of claim 5, wherein when the side wall of the wall is inclined to the substrate, in the longitudinal-section parallel to the first direction, the side wall of the wall is in any one or several combinations of rectilinear, curved, and stepped shapes.

7. The backlight assembly of claim 5, wherein an angle between the side wall of the wall and the substrate is an obtuse angle.

8. The backlight assembly of claim 1, wherein the wall is in a form of a narrowed width at one end.

9. The backlight assembly of claim 1, wherein
   the plurality of light emitters are distributed in an array on the substrate, or
   a plurality of the light emitters in two adjacent rows or columns are staggeredly distributed.

10. The backlight assembly of claim 9, wherein:
    the plurality of light emitters are arranged at equal intervals in a second direction and a third direction;
    a first interval of the plurality of light emitters in the second direction is equal to or different from a second interval in the third direction; and
    the second direction and the third direction intersect or are perpendicular to each other, and are both perpendicular to the first direction.

11. The backlight assembly of claim 1, wherein the substrate is a printed circuit board, and the substrate is a flexible substrate or a rigid substrate.

12. A display device, comprising:
    a display module having a display surface for displaying an image; and
    the backlight assembly of claim 1 disposed in a back direction of the display module opposite to the display surface.

13. The display device of claim 12, wherein:
    the display device further comprises an isolation plate;
    the isolation plate is disposed between the display module and the backlight assembly.

14. The display device of claim 13, wherein the wall supports the isolation plate or a diffusion plate.

* * * * *